United States Patent
Mooney

(10) Patent No.: US 12,048,997 B2
(45) Date of Patent: Jul. 30, 2024

(54) ROBOTIC DEFENDER FOR BASKETBALL AND OTHER SPORTS

(71) Applicant: ATHLETIQ, LLC, Lubbock, TX (US)

(72) Inventor: Matthew Mooney, Lubbock, TX (US)

(73) Assignee: ATHLETIQ, LLC, Lubbock, TX (US)

(*) Notice: Subject to any disclaimer, the term of this patent is extended or adjusted under 35 U.S.C. 154(b) by 0 days.

(21) Appl. No.: 18/512,940

(22) Filed: Nov. 17, 2023

(65) Prior Publication Data

US 2024/0083039 A1    Mar. 14, 2024

Related U.S. Application Data

(63) Continuation of application No. PCT/US2022/030089, filed on May 19, 2022.

(60) Provisional application No. 63/190,658, filed on May 19, 2021.

(51) Int. Cl.
| | | |
|---|---|---|
| B25J 11/00 | (2006.01) | |
| A63B 69/00 | (2006.01) | |
| B25J 9/16 | (2006.01) | |
| B25J 19/02 | (2006.01) | |
| A63B 24/00 | (2006.01) | |

(52) U.S. Cl.
CPC ......... B25J 11/003 (2013.01); A63B 69/0071 (2013.01); B25J 9/162 (2013.01); B25J 9/1653 (2013.01); B25J 9/1679 (2013.01); B25J 19/023 (2013.01); *A63B 2024/0065* (2013.01); *A63B 2220/803* (2013.01); *A63B 2220/806* (2013.01); *A63B 2225/50* (2013.01)

(58) Field of Classification Search
CPC ........ B25J 11/003; B25J 9/162; B25J 9/1653; B25J 9/1679; B25J 19/023; A63B 69/0071; A63B 2024/0065; A63B 2220/803; A63B 2220/806; A63B 2225/50

See application file for complete search history.

(56) References Cited

U.S. PATENT DOCUMENTS

| | | | | |
|---|---|---|---|---|
| 5,527,185 A * | 6/1996 | Davis | ...................... | A63B 69/00 473/448 |
| 6,224,503 B1 * | 5/2001 | Joseph | ................. | A63B 63/083 473/436 |
| 7,658,689 B2 * | 2/2010 | Crook, II | ........... | A63B 69/0002 473/422 |
| 8,852,031 B2 * | 10/2014 | Williams, Sr. | ...... | A63B 69/0071 473/450 |
| 9,095,755 B1 * | 8/2015 | Hill | ...................... | A63B 69/0071 |
| 9,259,634 B1 * | 2/2016 | Bouse | ................. | G09B 19/0038 |
| 9,782,648 B2 * | 10/2017 | DeCarlo | ............... | A61B 5/6895 |
| 9,968,838 B2 * | 5/2018 | Daniels | ................... | G06V 40/23 |
| 10,300,597 B2 * | 5/2019 | Takahashi | ................ | B25J 5/007 |
| 10,413,795 B2 * | 9/2019 | Moore, Jr. | .......... | A63B 69/0071 |

(Continued)

FOREIGN PATENT DOCUMENTS

CN   106346456 A   1/2017

OTHER PUBLICATIONS

WIPO International Searching Authority/USPTO, International Search Report and Written Opinion issued in corresponding application PCT/US2022/030089 mail dated Aug. 15, 2022 (11 pages).

*Primary Examiner* — Malina D. Blaise

(74) *Attorney, Agent, or Firm* — J. Peter Paredes; Amin Wasserman Gurnani LLP

(57) ABSTRACT

Provided is an apparatus, method, and system for simulating a defender of a sport activity.

16 Claims, 17 Drawing Sheets

(56) References Cited

U.S. PATENT DOCUMENTS

| | | | |
|---|---|---|---|
| 10,500,465 B1* | 12/2019 | Panaia | A63B 69/0071 |
| 10,618,175 B2* | 4/2020 | Unno | B25J 9/1651 |
| 10,953,298 B1* | 3/2021 | Perez Gutierrez | A63B 69/0071 |
| 11,302,213 B2* | 4/2022 | Connell | A63B 69/34 |
| 11,571,613 B1* | 2/2023 | Hoderny | A63B 24/0021 |
| 2009/0098955 A1* | 4/2009 | Crook, II | A63B 69/0002 |
| | | | 473/422 |
| 2009/0291781 A1* | 11/2009 | Caruso | A63B 71/023 |
| | | | 473/444 |
| 2012/0208660 A1* | 8/2012 | Mayers | A63B 69/0071 |
| | | | 473/447 |
| 2014/0200102 A1* | 7/2014 | Frostino | A63B 47/00 |
| | | | 473/422 |
| 2015/0120050 A1* | 4/2015 | Gomi | B25J 18/04 |
| | | | 700/258 |
| 2017/0036083 A1* | 2/2017 | Trombley | A63B 69/002 |
| 2017/0312607 A1* | 11/2017 | Moore, Jr. | A63B 69/0071 |
| 2020/0051456 A1* | 2/2020 | Connell | A63B 69/002 |

* cited by examiner

ROBOTIC DEFENDER FOR BASKETBALL AND OTHER SPORTS

BACKGROUND

1. CROSS-REFERENCE TO RELATED APPLICATIONS

The present application claims priority to PCT application serial no. PCT/US2022/030089, filed May 19, 2022, which claims priority to U.S. provisional application Ser. No. 63/190,658, filed May 19, 2021, each herein incorporated by reference in their entireties.

2. FIELD

The present disclosure relates generally to an apparatus for sports training and, in particular, a robot that simulates defensive opponents in the game of basketball, or other sports, so a user can practice and sharpen offensive skills.

3. DESCRIPTION OF THE RELATED ART

Static obstacles, such as dummy defender, or training mannequin, are often used between the players and the basket. However, this does not simulate a game-like situation where a defender is moving (e.g., extending arms or jumping) to present a more formidable obstacle. Further, static obstacles do not permit the player to receive a pass through the position occupied by the defender generally, e.g., from someone rebounding balls, which makes practice slower and more difficult.

SUMMARY

The following is a non-exhaustive listing of some aspects of the present techniques. These and other aspects are described in the following disclosure.

Some aspects include apparatuses and methods that serve as a robotic defender, whereby their movements are configured to present an obstacle between the player and basket over which the player must shoot.

Some aspects include an apparatus that provides a shot obstruction while also simulating the outstretched arms and hands of a defender when attempting to steal or strip the ball.

BRIEF DESCRIPTION OF THE DRAWINGS

The above-mentioned aspects and other aspects of the present techniques will be better understood when the present application is read in view of the following figure in which like numbers indicate similar or identical elements.

Figure 1:
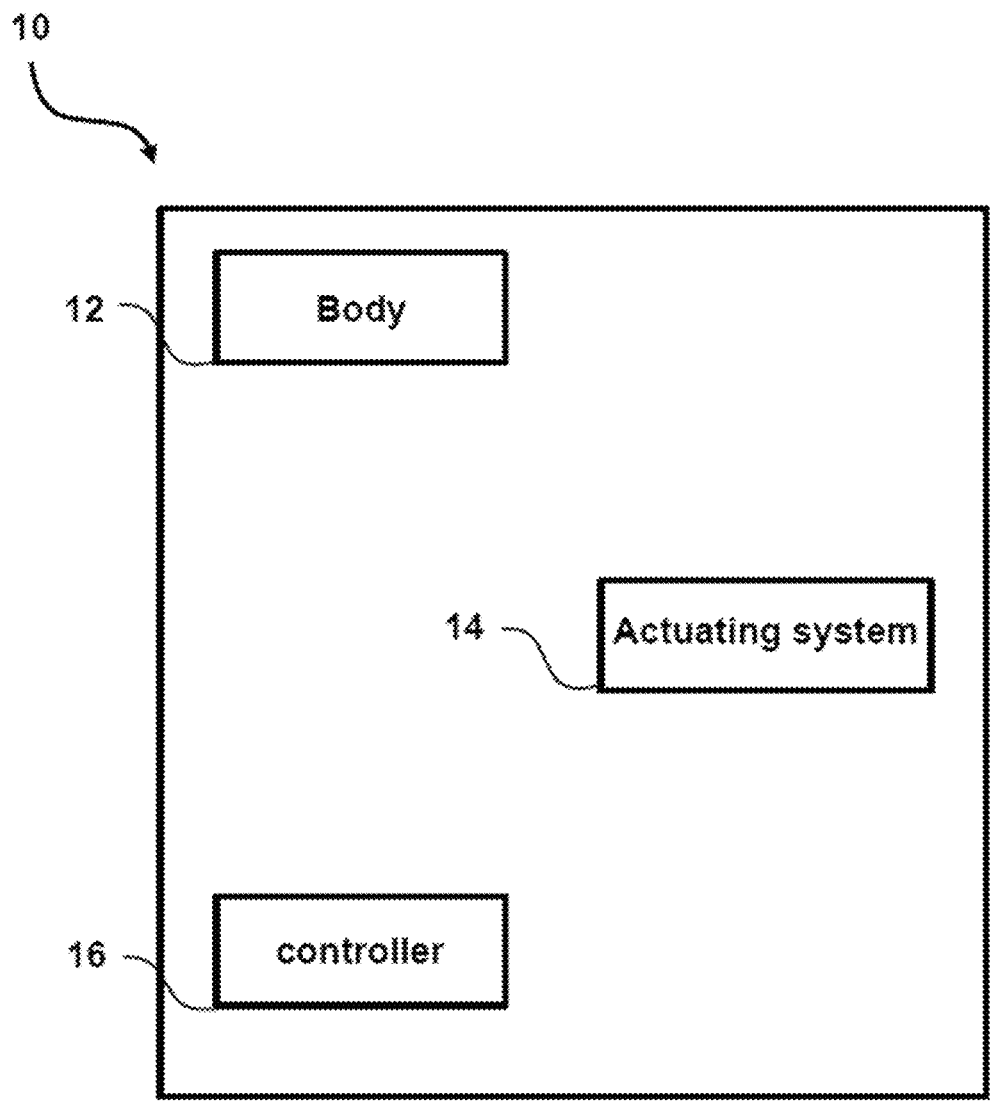
FIG. 1 is a block logical architecture diagram showing an embodiment of a robotic defender in accordance with some of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

The use of the terms "a" and "an" and "the" and similar referents in the context of describing the invention are to be construed to cover both the singular and the plural, unless otherwise indicated herein or clearly contradicted by context. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g." or "such as") provided herein, is intended merely to better illuminate the invention and does not pose a limitation on the scope of the invention unless otherwise claimed. No language in the specification should be construed as indicating any nonclaimed element as essential to the practice of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As used herein the term "method" refers to manners, means, techniques and procedures for accomplishing a given task including, but not limited to, those manners, means, techniques and procedures either known to, or readily developed from known manners, means, techniques and procedures by practitioners of the software and electrical arts. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

DESCRIPTION OF EMBODIMENTS

To mitigate the problems described herein, the inventors had to both invent solutions and, in some cases just as importantly, recognize problems overlooked (or not yet foreseen) by others in the field of robotics. Indeed, the inventors wish to emphasize the difficulty of simulating the outstretched arms and hands of a defender when attempting to steal or strip the ball. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments act as a robotic defender that may reduce the probability that a basketball player makes a successful shot. Some embodiments are static, with a pass-through region, and some are configured to move to block shots. In some embodiments, a robotic defender 10 may include a body 12, an actuating system 14, and a controller 16, as shown in FIG. 1.

In some embodiments, the body 12 may be made of various impact-resistant materials, such as polymers (e.g., plastic, rubber, etc.), woods, metals, and a combination thereof. In some embodiments, the shape and dimensions of the body are approximately match those of a basketball player (e.g. an adult basketball player or a high school basketball player).

In some embodiments, the body 12 may include a first arm and a second arm, symmetrically disposed on opposing sides. The first and the second arms may be elongate rigid or extendable. The arms may have dimensions similar to human arms (e.g., between about 2 and about 4 feet), to simulate the real game conditions, or bigger dimensions to simulate a harder than real game conditions for training purposes. The arms may have the same length, or different length (e.g. one arm fully extended and one arm only partially extended). In some embodiments, the length of each arm is adjustable. The length of each of the arms may vary from twenty to forty inches. The arms' movements may be in unison or independently, with speed and timing of each arm being adjustable.

In some embodiments, arms may extend at a pre-determined noncontact angle above the horizontal (e.g. parallel to the floor) to simulate posture of a defender in a real-game condition. The arms angle may be adjusted between about 30 to about 90 degrees from a plane parallel to the floor. In some embodiments, arms may have elbow joints that can provide means of movements similar to the movements of a defender forearms in real-game condition. The arms may have shoulder joints that can provide means of movements to raise or lower the arms. In some cases, the arms have three degrees of freedom each (elbow movement and shoulder rotation about two axes) and a corresponding number of actuators.

In some embodiments, the body 12 may have a vertical movement degree of freedom (e.g., a telescoping core) and corresponding actuator to simulate jumping of a defender in the real-game condition. The body may also have an adjustable height. For example, the height of the robotic defender 10 may be adjusted to match the height of a defender that a player, who is the subject of the training, will be facing in the future. In some embodiments, the height of the robotic defender may be adjusted to simulate basketball defenders of various heights, arm reach, and jumping abilities. The height of the robotic defender may be adjusted by means of frictional adjustment screws. The height of the robotic defender may be adjusted from 5 feet to 8 feet to challenge various sizes of opponents on the court.

In some embodiments, the body 12 may be moveable and adapted to rest on a basketball court floor in a position to withstand contact by a basketball player. The body 12 may have sufficient weight to provide stability to the robotic defender 10 when robotic defender 10 is bumped by a player or hit by a ball during use.

In some embodiments, the body 12 may be configured to rest at a specific position on basketball floor. In some embodiments, the body 12 may have movement actuators (e.g., wheels or rollers coupled to motors) to simulate the movements of a defender in real-game condition. The body may be configured to move along a line in one degree of freedom or in a plane with two degrees of freedom. Support for movement may also allow the robotic defender to be easily rolled on or off the court or repositioned on the court as desired during a training session.

In some embodiments, an actuating system 14 may include a structure that links to the body 12 and has an actuator for moving the parts of the body. The actuating system may include electric motors and gearboxes, solenoids, pneumatic actuators, hydraulic actuators or a combination thereof. Structural materials employed may be metal, plastic, carbon fiber or wood, while cosmetic outer coverings can comprise vinyl, rubber or plastic.

In some embodiments, the controller 16 of the robotic defender 10 may be configured to prioritize and localize Objects of Interest (e.g., a basketball player) in their surroundings and move in response to the location or trajectory of those Objects of Interest, in some cases, without requiring an input from an operator.

In some embodiments, the controller 16 may couple to a sensor suite that includes a camera, a depth camera, ultrasonic sensors, infrared transmitters and receiver, contact sensors, audio sensors, and the like. The controller may be configured to calculate the relative distance between Objects of Interest and the robotic defender 10. Based on the determined distance, the controller may choose a defending strategy (e.g. blocking, jumping, extending arms, etc.). In some embodiments, the controller may store data from the sensor suite or metrics computed based on such data. In other embodiments, the sensor suite may operate as a computer vision system. The sensor suite may sensor the position and location of a ball and may operate to avoid the ball or defend the ball.

In some embodiments, the robotic defender may be configured to autonomously position itself relative to an Object of Interest (e.g., a shooter.) In some embodiment, the robotic defender may be set at a fix position on the floor (e.g., a basketball court) and it may move only vertically (e.g., simulating jumping or extending arms) to block the Objects of Interest (e.g., the shooter or the ball.) In some embodiments, the robotic defender may be configured to move on the floor with one degree of freedom (e.g. moving along a line). In some embodiments, the robotic defender may be configured to move on the floor with two degrees of freedom (e.g. moving on an x-y plane parallel to the floor plane). In some embodiments, the robotic defender may be configured to move with 3 degrees of freedom (e.g. moving on the floor and extending vertically to block a shooter or rotating about the vertical axis).

In some embodiments, the controller may be configured to process data (e.g. data from the sensor suite) and determine the number and location of Object(s) of Interest relative to the robotic defender. In some embodiments, the controller may process the received data at a rapid enough pace to capture the trajectory of fast moving Object(s) of Interest. In some embodiments, the controller may perform data association tasks by using machine learning techniques, including techniques to predict object positions and movements (e.g., studying the movement of a basketball player to predict how fast a player can catch a ball and take a shot).

In some embodiments, machine learning techniques may be used to predict the behavior of a shooter (e.g., timing, jumping height, speed, extension of arms, form, body posture, etc.) to increase the chance of the robotic defender successfully blocking the shot. In some embodiments, a machine learning model may be tuned for simulating the defending (e.g. blocking) skills of a specific player. For example, if a user want to train specifically for a defender whom the user will be facing in his next match, the user can setup the robotic defender to simulate the movements and blocking postures of that defender.

In some embodiments, the controller may be configured to rank detected Objects of Interest based on their class (e.g. player with the ball, player closer to the robot, player in better position to take a shot, etc.). In some embodiments, the controller may rank the Objects of Interest based on their distance from the robotic defender. Based on these rankings the controller may identify a singular object of interest to be the highest priority. For example, the player in possession of the ball may be determined as the highest priority object of interest and a player located as the closest player or best position to take a shot may be associated as the second highest ranking Object of Interest.

In some embodiments, the controller may include a plurality of sensors that can monitor the surrounding area (e.g. motion sensors and cameras) and specifically target a user (e.g. basketball player) as the Object of Interest. In some embodiments, the sensors may be configured to determine the moment that the player will shoot. Sensors may be focused on the movements of the player in possession of the ball. For example, the sensors may be tracking the player's eyes, knees, arms, or other body parts to monitor when the player will shoot.

Figure 2A:
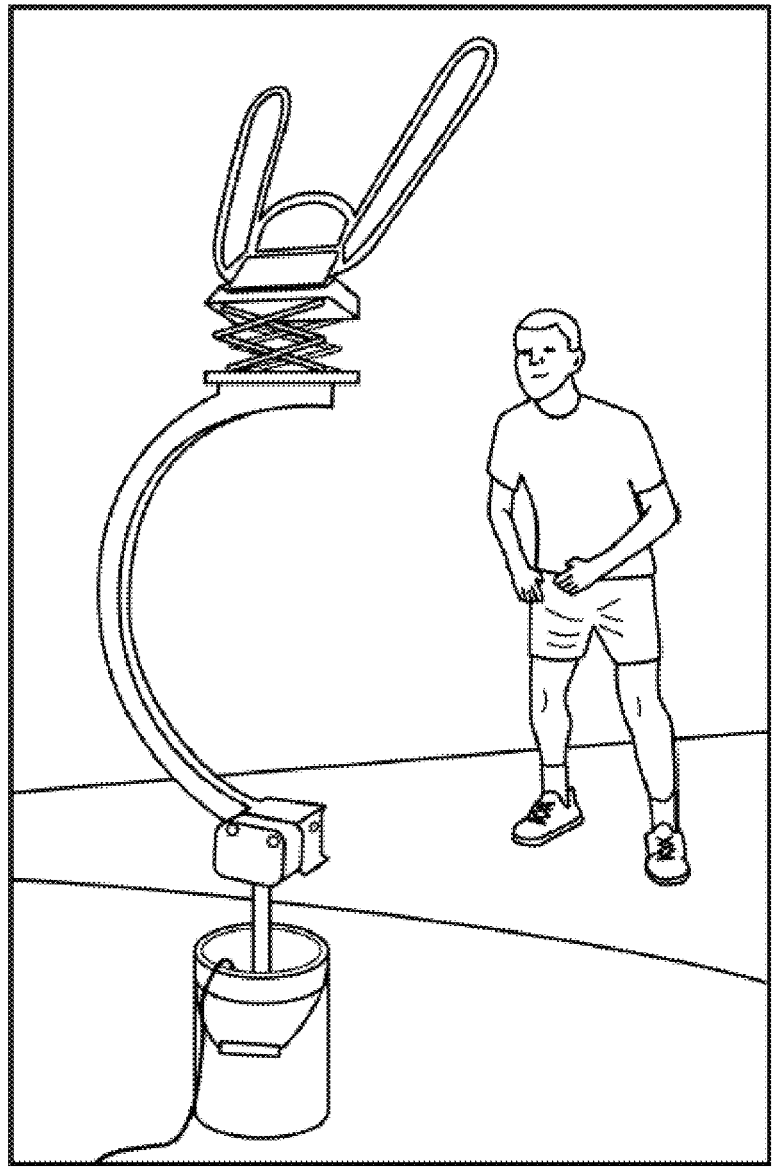
FIG. 2A shows a robotic defender in the non-extended mode, in accordance with some of the present techniques.
Figure 2B:
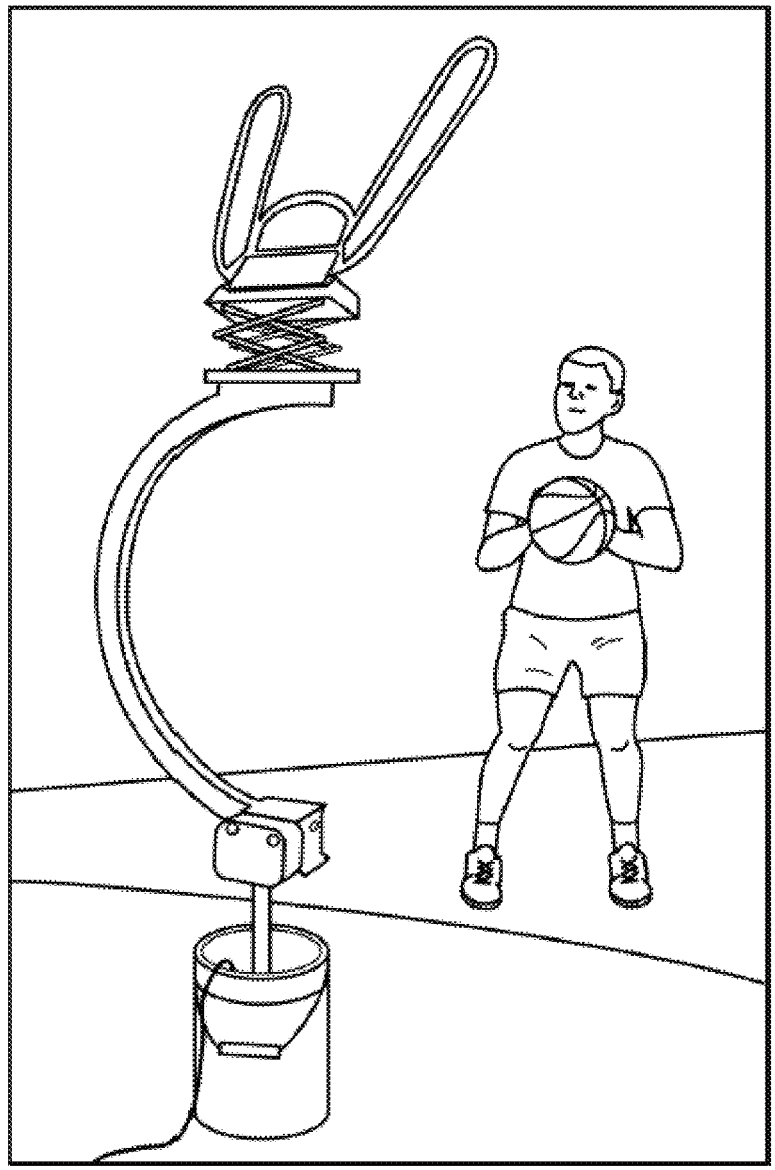
FIG. 2B shows a robotic defender during the transformation from the non-extended mode into extended mode, in accordance with some of the present techniques.
Figure 2C:
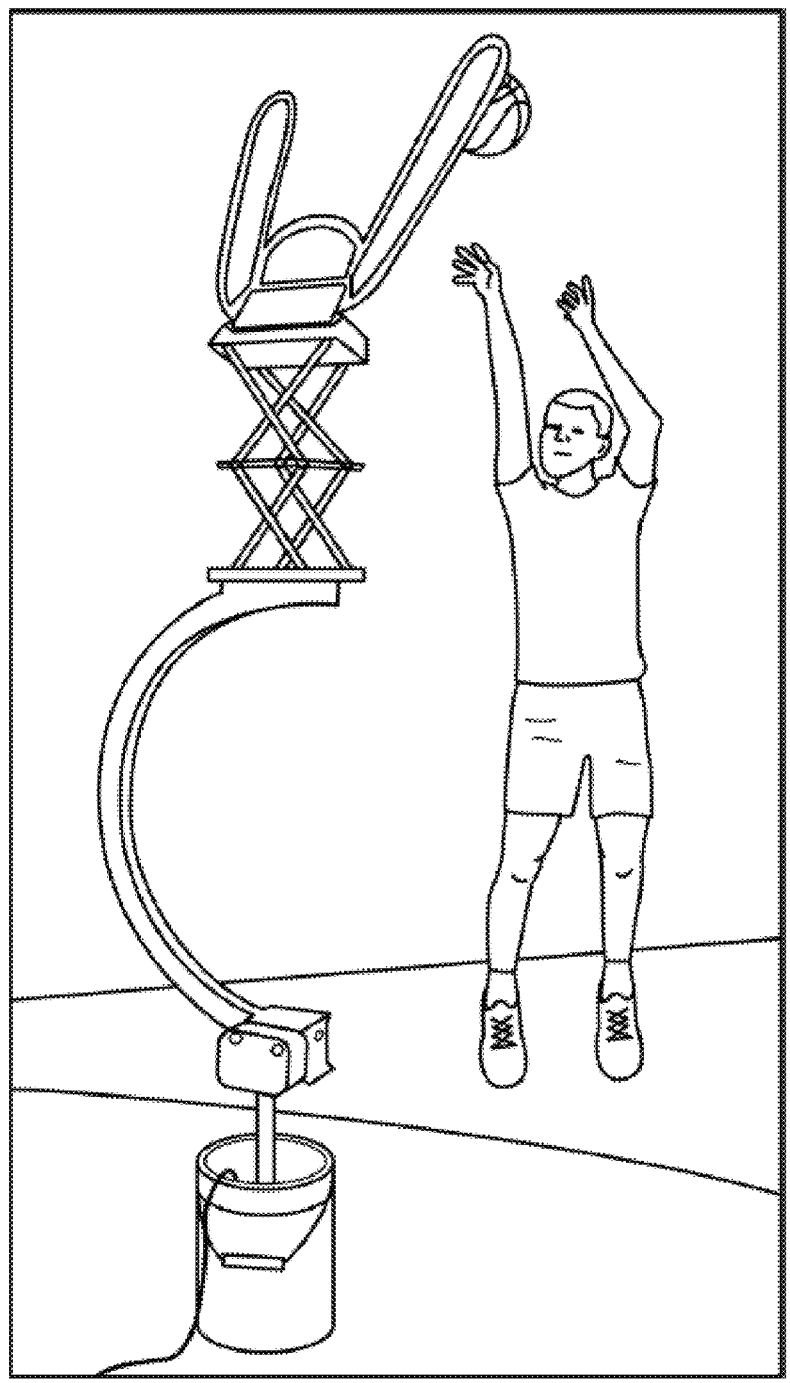
FIG. 2C shows a robotic defender in the extended mode, in accordance with some of the present techniques.

FIGS. 2A-2C show an example of a robotic defender's operation, in accordance with some of embodiments. In some embodiments, the robotic defender may be positioned on a basketball floor in front of a basketball hoop and board in front of a basketball player who intends to take a shot, as shown in FIG. 2A. The sensors of the robotic defender may monitor the movements of the player to determine when to attempt blocking the player's shot, in the non-extended format (e.g., simulating a basketball player in the defending position), shown in FIG. 2B. Once the robotic defender detects that the shooter is about to take a shot, the robotic defender may transform into the extended mode (e.g. extended the arms or increasing the height) to simulate defending behavior of a basketball player in the defending position, as shown on FIG. 2C.

Figure 6A:
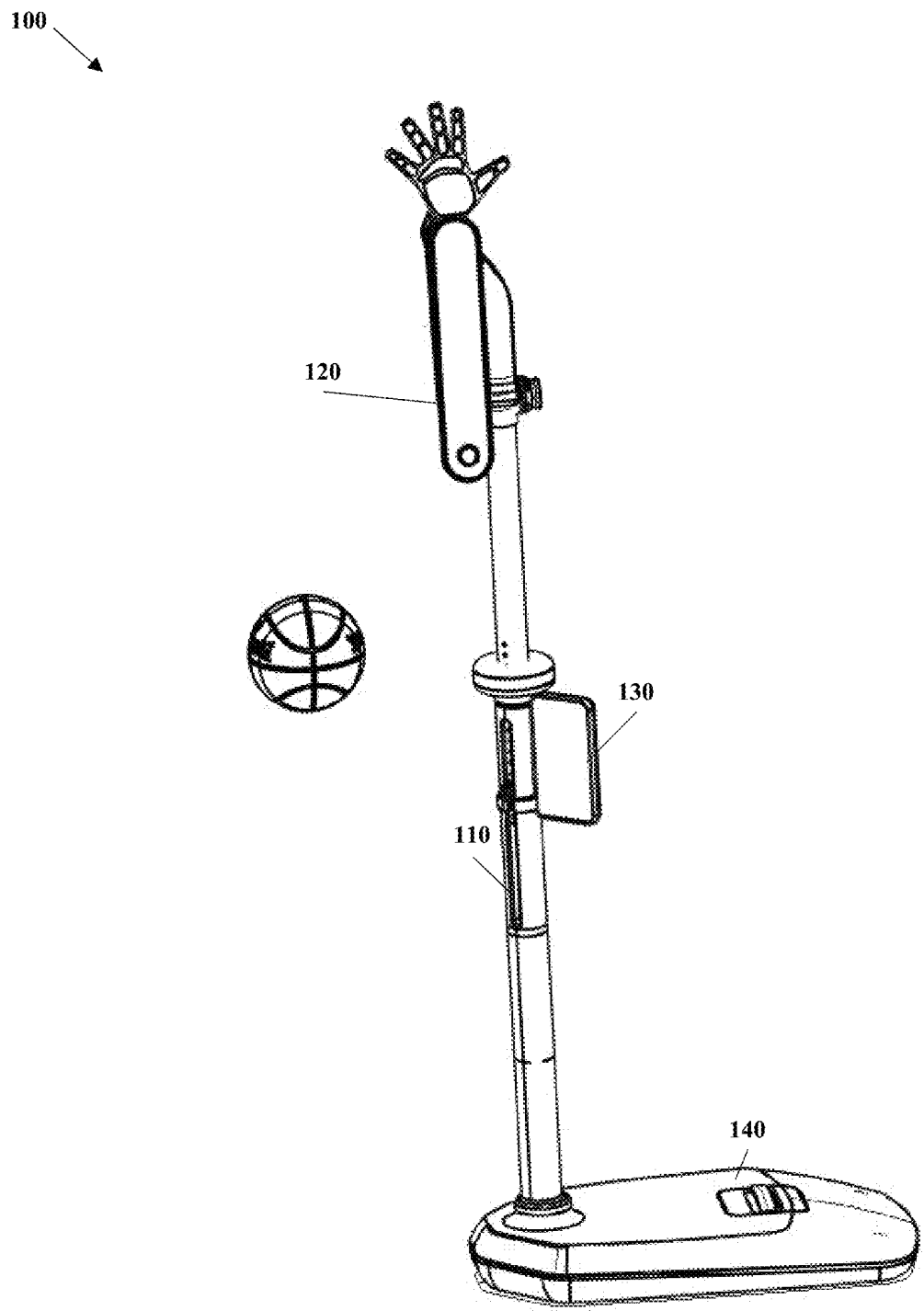
FIG. 6A is a front perspective view of a robotic defender in the non-extended position, according to one embodiment.
Figure 6B:
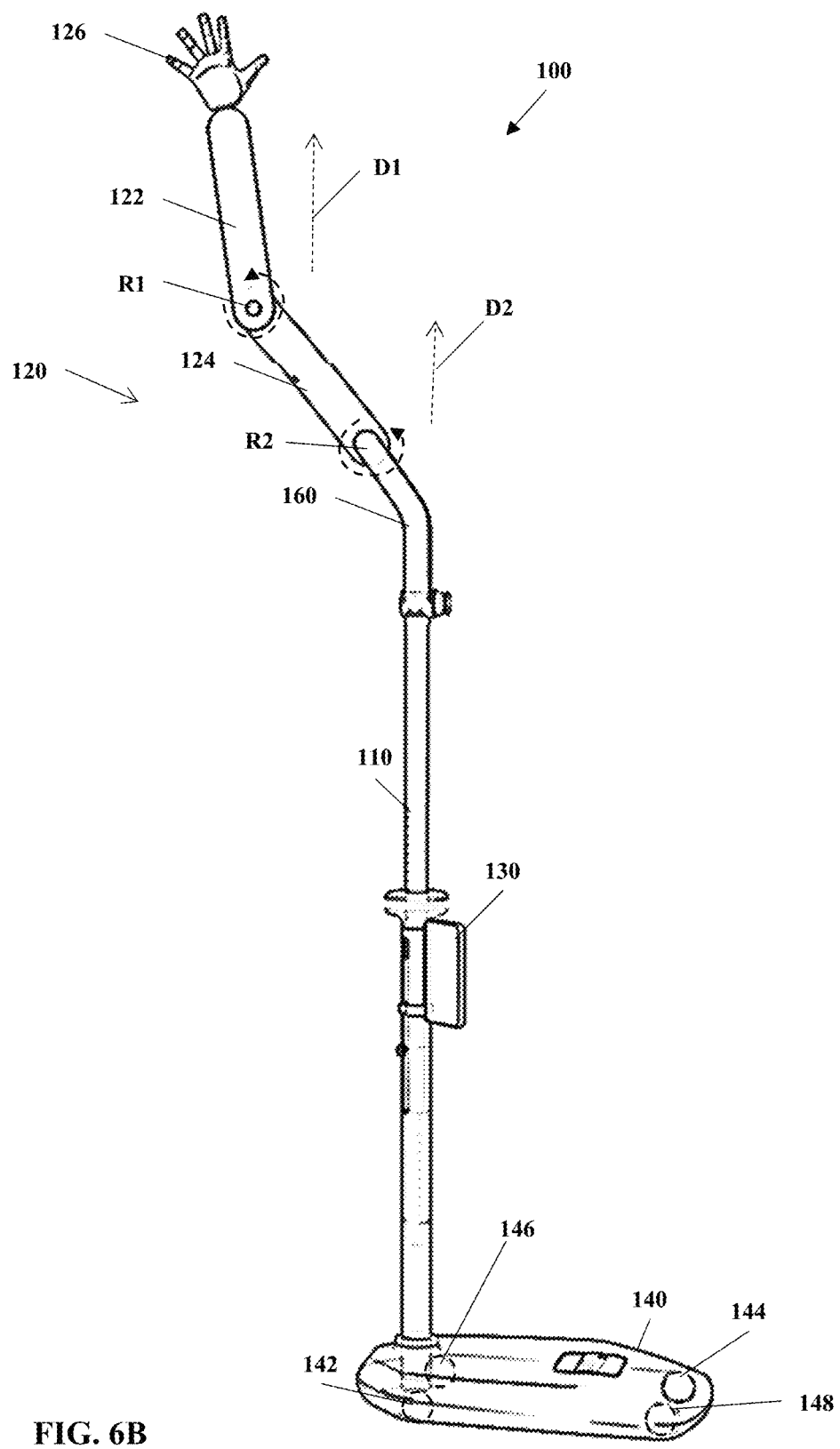
FIG. 6B is a front perspective view of a robotic defender in the extended position, showing the wheels in phantom, according to one embodiment.

FIGS. 6A-6F shown an alternative embodiment of the robotic defender 100. FIG. 6A shows the robotic defender includes a body portion 110 operably coupled to the actuating system 120 and a controller 130 and a movable base 140 in the non-extended position. The controller 130 is operably coupled to the actuating system, body portion, and the moveable base, wherein the controller is configured to trigger the actuating system, moveable base, and body portion to rotate and extend the first arm and the second position the hand portion in the extended position to block a sports player. FIG. 6B shows the moveable base 140 including a first wheel 142, a second wheel 144, a third wheel 146, and a fourth wheel 148 that are operably coupled to a battery to move the robotic defender 100. The actuating system 120 includes a first arm 122 and a second arm 124, wherein the first arm 122 includes the hand portion 126 extending therefrom and the second arm 124 is operably connected to an arm bar 160. The first arm 122 is rotatable with respect to the second arm 124 about axis R1 and the second arm 124 is rotatable with respect to the arm bar 160 about axis R2. The rotation of the first arm 122 about axis R1 extends the hand portion 126 generally in direction D1 and rotation of the second arm 124 about axis R2 extends the first arm 122 generally in direction D2. As such, the rotation and extension of the first arm 122 and the second arm 124 position the hand portion 126 in the blocking and extended position in response to a sensor operably coupled to the controller 130.

Figure 6C:
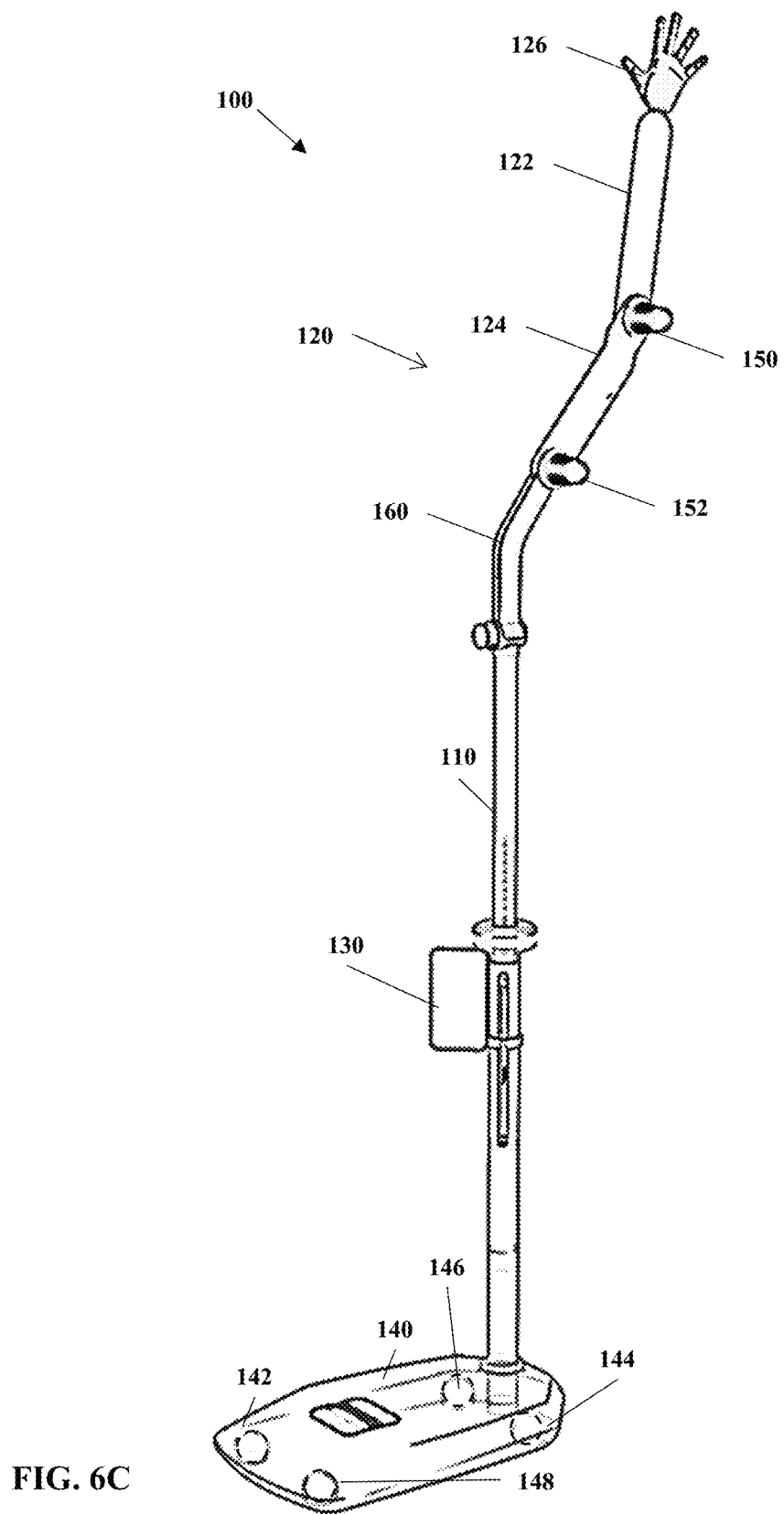
FIG. 6C is a back perspective view of a robotic defender in the extended position, showing the wheels in phantom, according to one embodiment.
Figure 6D:
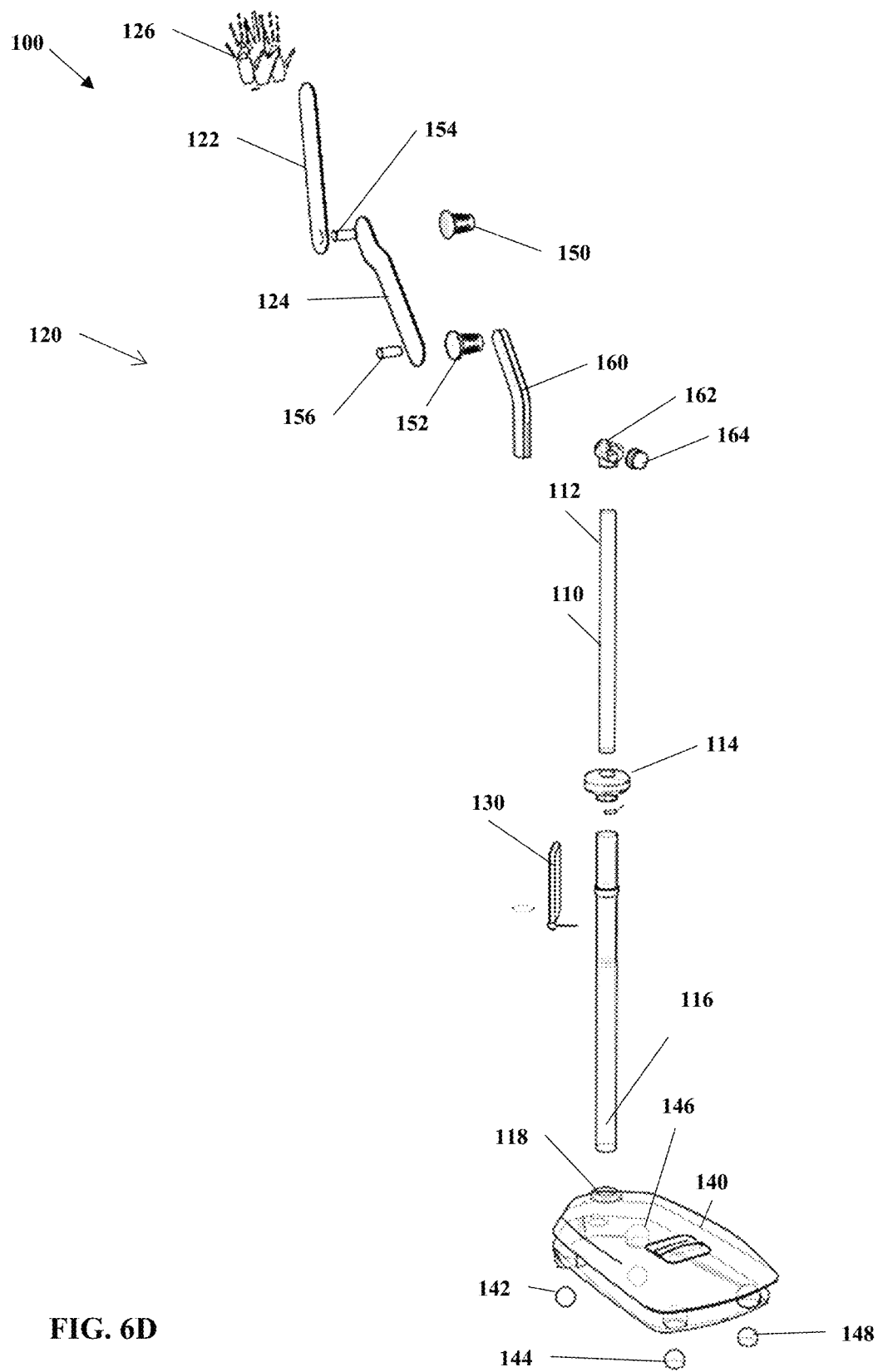
FIG. 6D is an exploded view of a robotic defender of in the extended position, according to one embodiment.
Figure 6E:
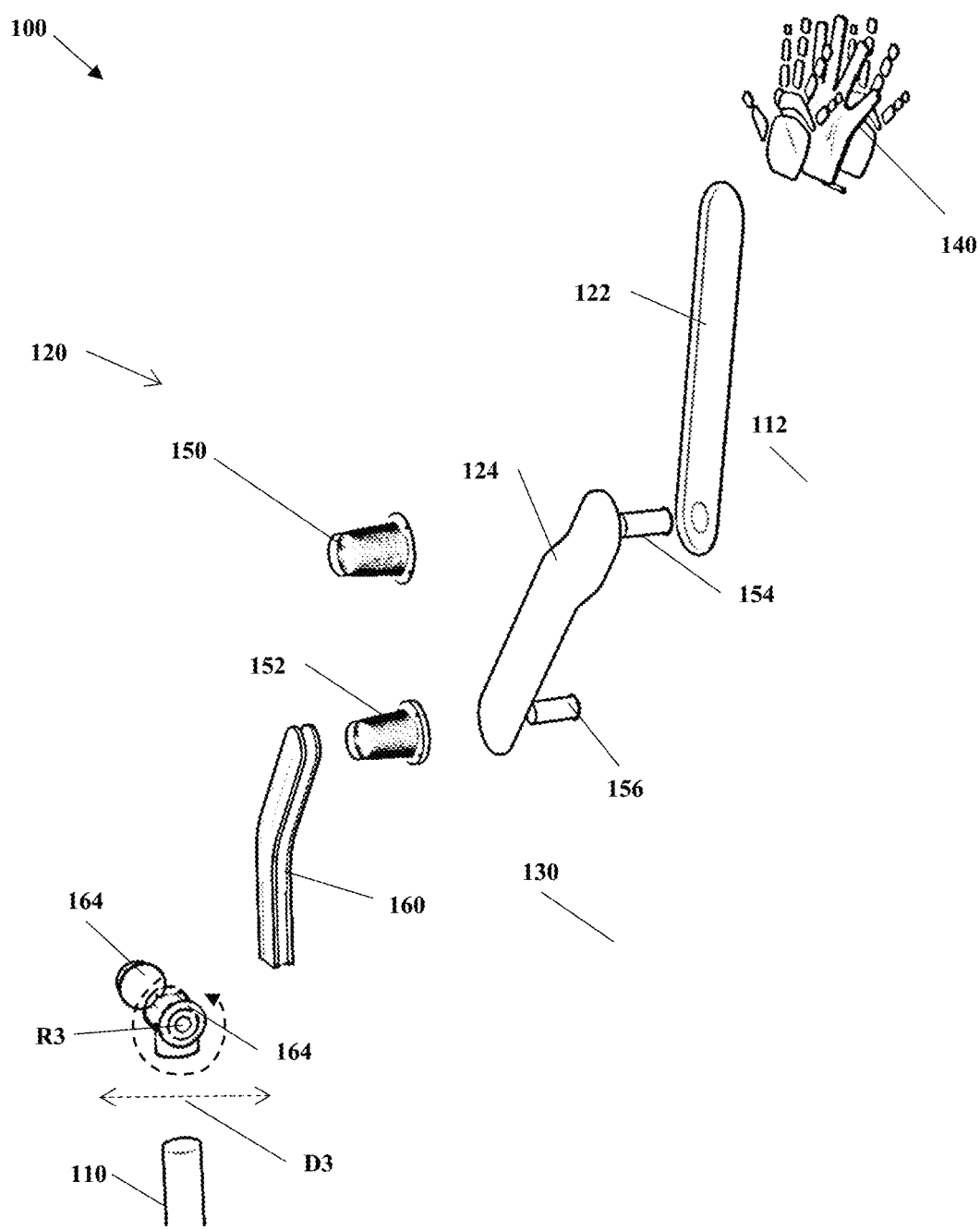
FIG. 6E is an exploded enlarged view of a robotic defender and the moveable base and body portion, according to one embodiment.
Figure 6F:
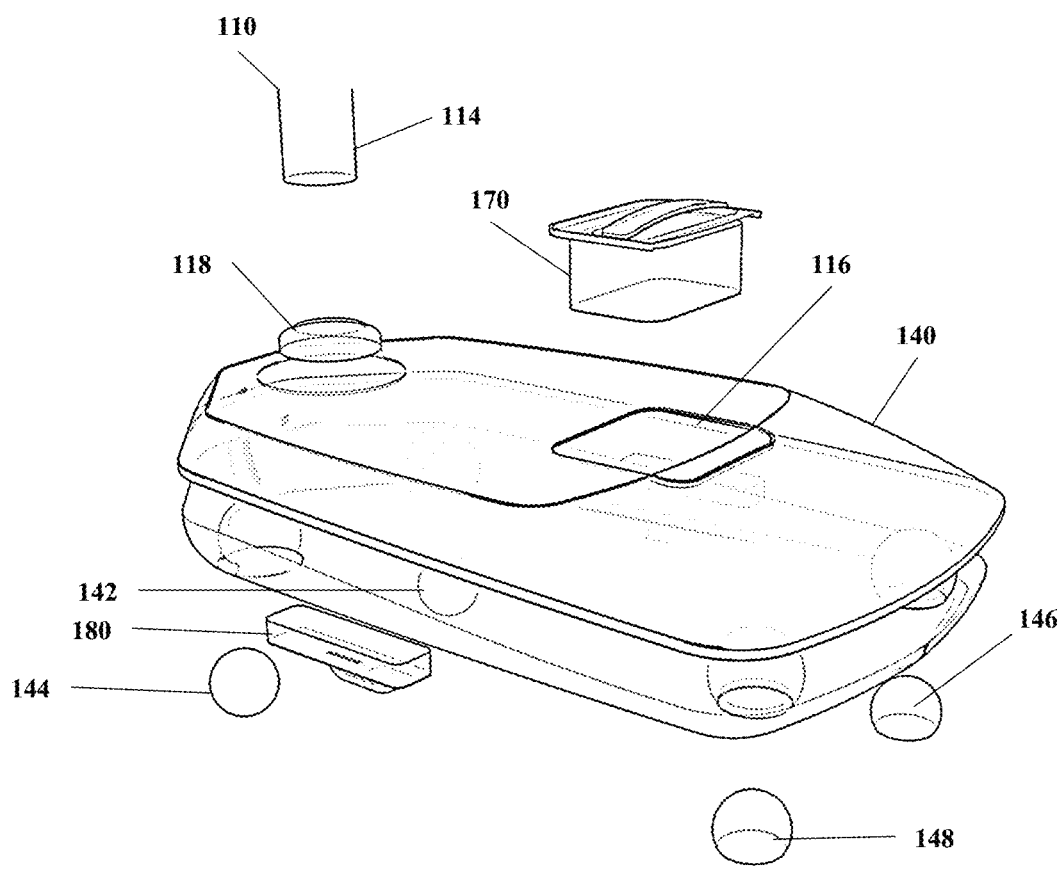
FIG. 6F is an exploded view of a robotic defender and the moveable base, according to one embodiment.

FIG. 6C shows the robotic defender 100 in the extended position, wherein the first arm 122 and is operably coupled to the second arm 124 by way of the first motor 150, and the second arm 124 is connected to the arm bar 160 by way of second motor 152. The arm bar 150 is connected to the top portion of by the body portion 110. FIG. 6D-6E shows the robotic defender 100 in the exploded position, wherein the first motor 150 is rotatably coupled to a first pin 154, and the second motor 152 is rotatably coupled to a second pin 156. The arm bar 160 is connected to the top portion 112 of the body portion 110 by way of a rotatable coupling 162 and a cap 164. The rotatable coupling 162 allows the arm bar 160 to rotate about an axis R3 with respect to the body portion 110, and move the actuating system 120 in direction D3. The middle portion of the body 110 includes a central coupling 114, which connects to the controller 130 by way of a pin. The central coupling 114 allows the controller 130 to rotate about an axis with respect to the body 110 and allows the body portion 110 to move vertically upward or downward away from the controller 130. In one embodiment, the body portion 110 includes a third motor to move the body portion 110 upward or downward with respect to the moveable base 140. The bottom portion 116 of the body portion 110 connects to the moveable base 140 by way of the circular seat 118. FIG. 6D-6E show the circular seat 118 allows the body portion 110 to rotate about an axis with respect to the moveable base 140. The moveable base 140 includes a battery 170 operably coupled to the wheels 142, 144, 146, and 148 to move the robotic defender. In one embodiment, the wheels 142, 144, 146, 148 include a pedal system to clamp the wheels down to the moveable base. The battery 170 is removable, replaceable, and rechargeable. The moveable base 140 includes a projector 180 that projects a laser line or optical markings on the floor that are used to help align the shooter and for safety.

Figure 7:
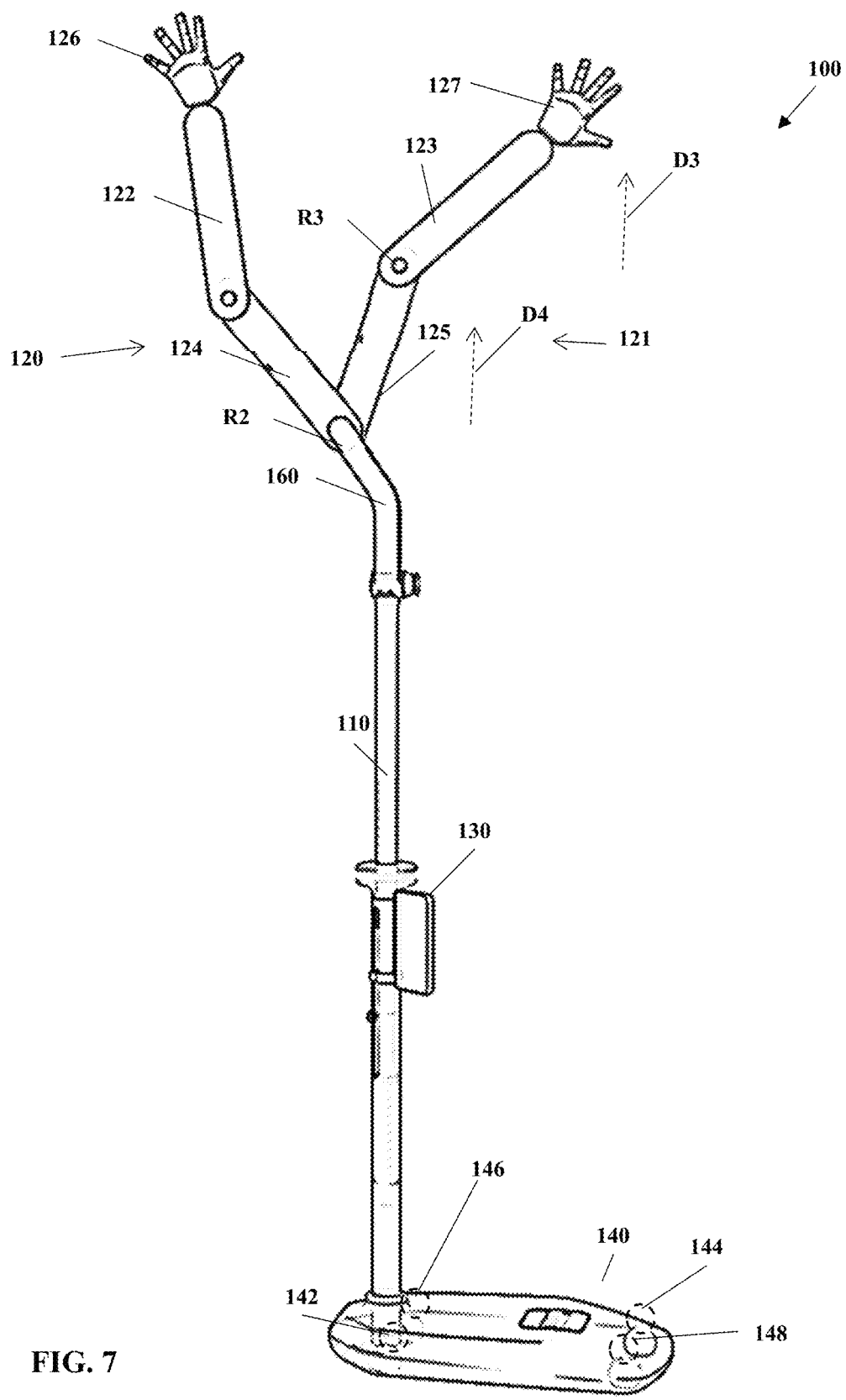
FIG. 7 is a front perspective view of a robotic defender in the extended position with a third arm and a fourth arm, according to one embodiment.

FIG. 7 is a front perspective view of a robotic defender in the extended position with a second actuating system 121 includes a third arm 123 and a fourth arm 125, wherein the third arm 123 includes a second hand portion 127 extending therefrom and the fourth arm 125 is operably connected to an arm bar 160. The third arm 123 is rotatable with respect to the fourth arm 125 about axis R3 and the fourth arm 125 is rotatable with respect to the arm bar 160 about axis R2. The rotation of the third arm 123 about axis R3 extends the second hand portion 127 generally in direction D3 and rotation of the fourth arm 125 about axis R2 extends the third arm 123 generally in direction D4. As such, the rotation and extension of the third arm 123 and the fourth arm 125 position the second hand portion 127 in the blocking and extended position in response to a sensor input. The controller is configured to trigger the actuating system to rotate and extend the first arm and third arm and the second position of the first and second hand portion in the extended position to automatically block a sports player in response to a sensor input, wherein the sensor input is a motion by the sports player.

In some embodiments, the robotic defender may simulate real-life blocking behavior of a basketball defender who realizes a shooter is about to take a shot. In some embodiments, the robotic defender is configured to have multiple operating modes (e.g., levels of difficulty) with different lag time between the time that the sensors detect intention of a shot and the time that the robotic defender transforms into the extended mode to block the shot. In one embodiment, the robotic defender may operate in a random mode, where the robotic defendant switches randomly between blocking shots in the extended position and guarding the shooter in the non-extended position.

In some embodiments, the robotic defender may be configured to detect movements of the basketball to predict the right time to extend and block the shot. In some embodiments, the robotic defender may be configured to detect movements of the shooter body, including movements of the arms (e.g., shooter extending his arms to take the shot), knees (e.g., shooter getting ready to jump), legs, or feet (e.g., detecting the jumping time).

In some embodiments, sensors may be placed on the basketball to predict the exact shooting time. The robotic defender may transform to extended mode as the sensors detect the basketball approaching the robotic defender.

In some embodiments, sensors may be placed on the shooter (e.g., the basketball player who is training with the robotic defender) to track the movements of the arms, knees, body pose, or other body parts in order to detect the shooting time.

In some embodiments, the robotic defender may be equipped with a remote control, instead of sensors, to trigger the actuators. For example, a remote may be used by a coach to activate the actuators and transform the robotic defender into the extended mode when a player wants to take a shot. In some cases, all of the described actuators of the various embodiments herein may be controlled by a human operator via remote control.

In some embodiments, both arms may be extended at the same time to block a shot. In some embodiments, only one arm may be extended (e.g. the arm closer to the shooter or the ball). In some embodiments, both arms may be extended separately with different extension timing and length (e.g. one arm fully extended and one are only partially extended to simulate the real-life experience.)

In some embodiments, the arms may be only moving at the shoulder joint with the help of some actuating mechanism. The arms may be moving with only one degree of freedom (e.g. only vertically, extending upward and downward), two degrees of freedom (e.g. extending both vertically and horizontally towards the shooter), or three degrees of freedom.

In some embodiments, the arms may be moving at the shoulder joint and at the elbow joint. In some embodiments, the arms may be moving at the shoulder joint, elbow joint, and wrist joint.

Figure 3A:
FIG. 3A shows a schematic of a robotic defender, in accordance with some of the present techniques.
Figure 3B:
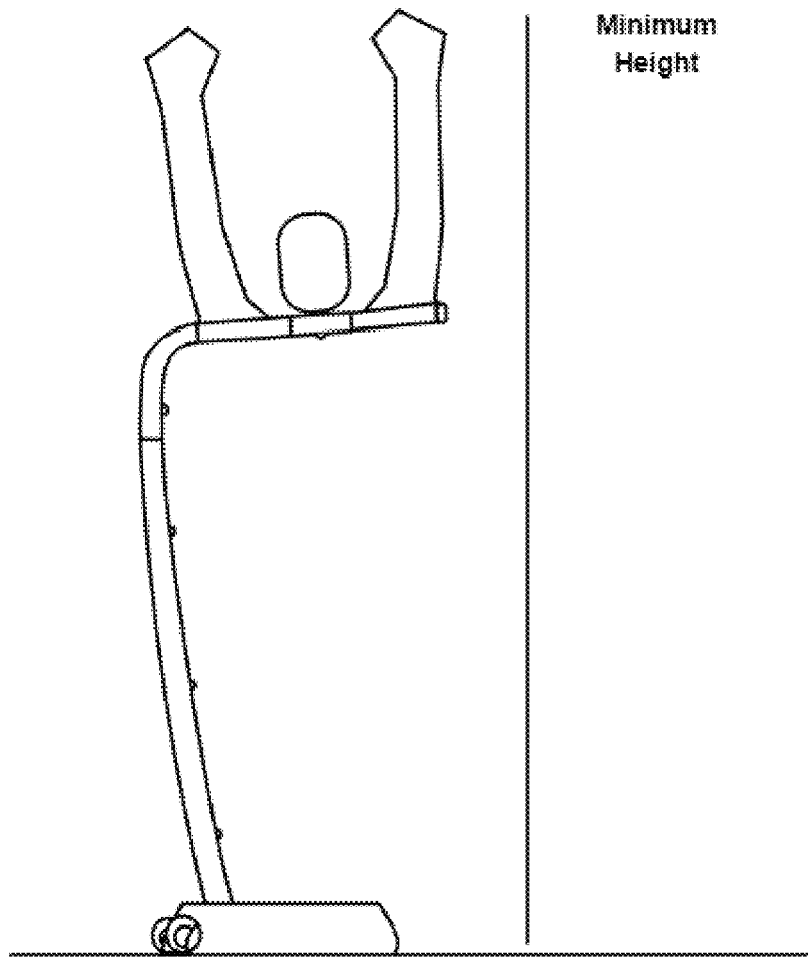
FIG. 3B shows a schematic of a robotic defender in the non-extended mode, in accordance with some of the present techniques.
Figure 3C:
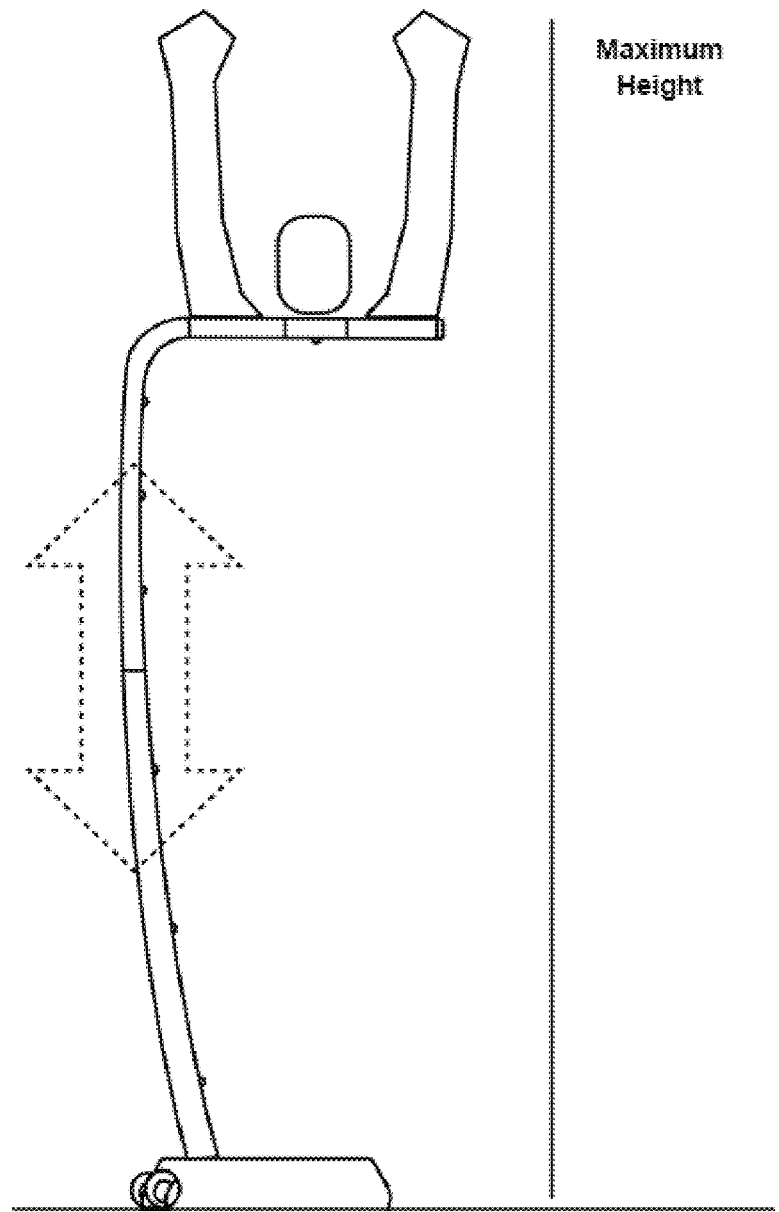
FIG. 3C shows a schematic of a robotic defender in the extended mode, in accordance with some of the present techniques.
Figure 3D:
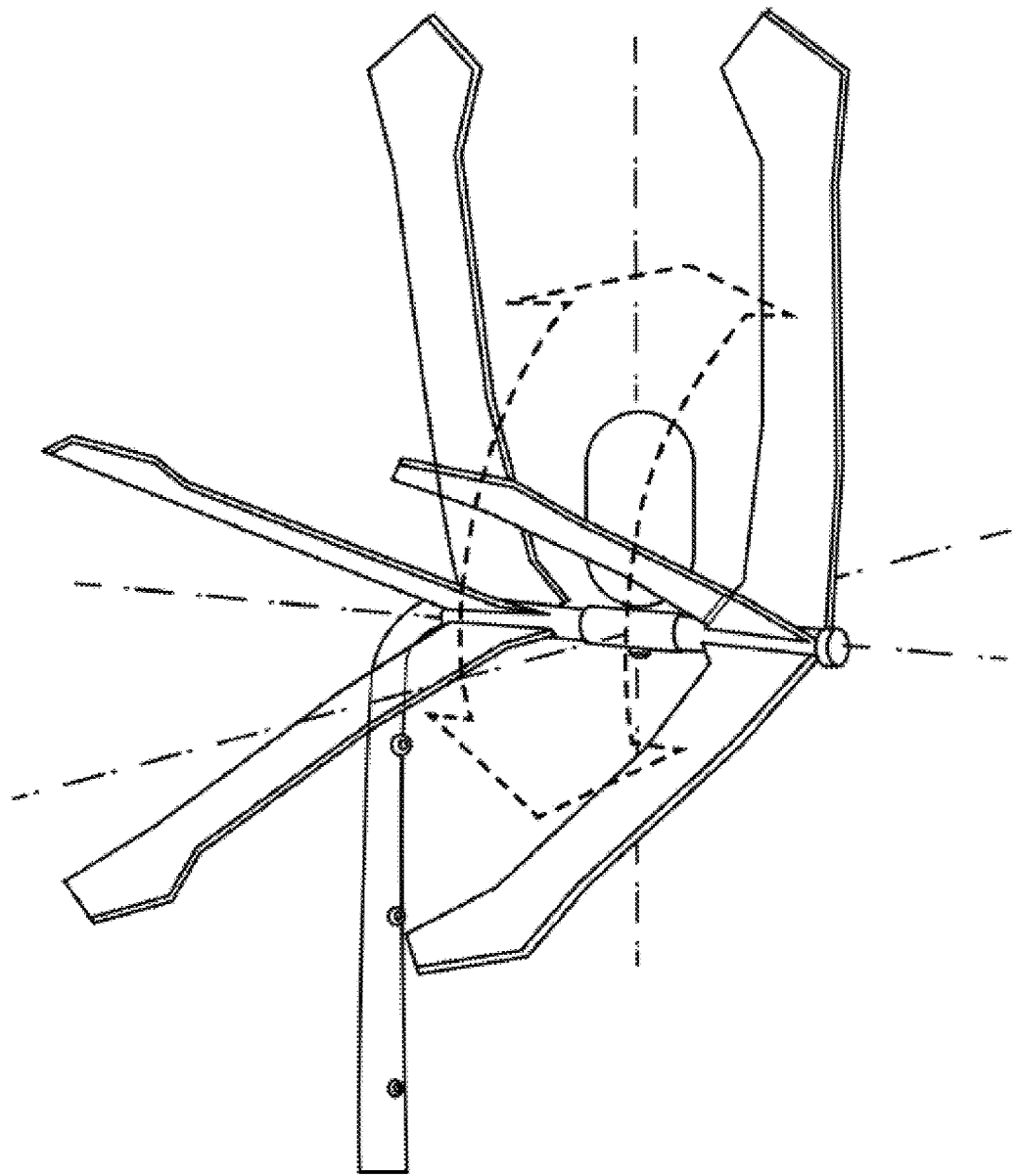
FIG. 3D shows a schematic of arms of a robotic defender, in accordance with some of the present techniques.

FIGS. 3A-D show another example of a robotic defender. In some embodiments, the robotic defender may have a height of a real-life basketball player with two extended arms, as shown in FIG. 3A. The robotic defender can transform from a non-extended position, as shown in FIG. 3B, into an extended position, as shown in FIG. 3C, to simulate jumping of a basketball player with the intention of blocking the shot. In some embodiments, the extended arms may move towards the shooter, as shown in FIG. 3D, to simulate real-life movements of a basketball defender.

Figure 4:
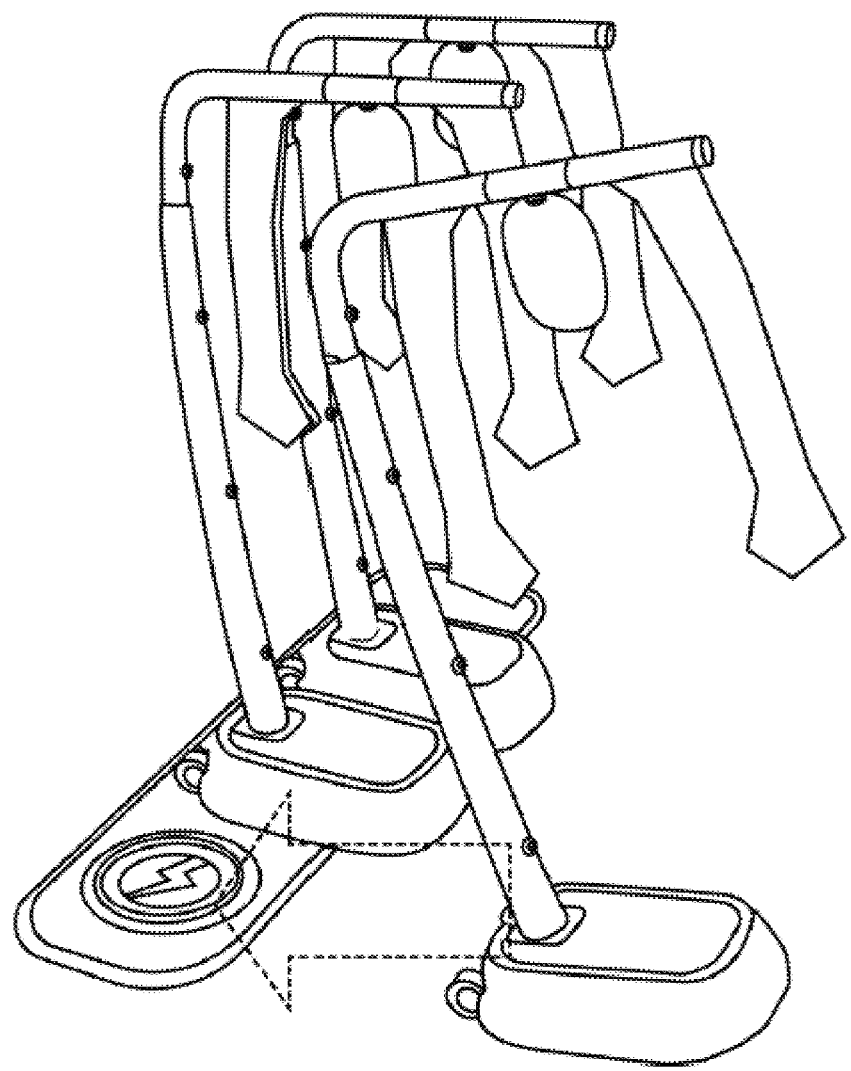
FIG. 4 shows a schematic of a robotic defenders and their charging station, in accordance with some of the present techniques.

As shown in FIG. 4, a robotic defender may be stationed on a charging mount to charge the battery of the robotic defender. In some embodiments, the robotic defender may be powered by chargeable batteries, non-chargeable batteries, AC current, DC current, solar panels, etc.

In some embodiments, the robotic defender may be used in various sports such as soccer (e.g. goalkeeper), football (blocking kicks or passes), volleyball (e.g. defender on the net), tennis, badminton, etc. for training purposes.

Various aspects of the described logic may be implemented with a computing device like that shown in FIG. 5 and described below.

Some embodiments may afford a robotic shot blocker with a relatively robust sensor suite, relatively large numbers of degrees of freedom, and machine learning capabilities to track player pose and ball movement. Some embodiments may include a remote server storing profiles of defensive players (such as profiles with configuration parameters that tune robot behavior to match that of various professional basketball players identified in association with the profiles, such that users can select a given professional basketball player as a defender to be loaded into a model controlling operation of the robotic defender over the Internet from the remote server). In some embodiments, the remote server may further receive, via the Internet, metrics indicating performance of a player practicing with the robotic defender, for example, shot locations, shot percentages, block percentages, and various biomechanical metrics or recordings of the player taking shots.

In some embodiments, the system may include a sensor suite of the robotic shot blocker located local to a facility where the robotic shot blocker is being used, with sensors being located on the robotic shot blocker itself or deployed in the same room and communicating via a local area network connected to an access point configured to communicate with the remote server. Examples of such sensors include stereoscopic optical cameras, for instance located at head height in positions analogous to the eyes of a player on the robotic shot blocker, as well as oriented in the opposite direction to capture video of the backboard of a basket to track whether shots are made. Some embodiments may include arrays of more than two stereoscopic cameras, such as optical video cameras to obtain higher fidelity depth information. Some embodiments may include other cameras, like video cameras positioned off the robot, for instance with a substantial portion, like more than ¼ or more than half of the court including the robotic shot defender and the player in their field-of-view to capture video suitable for characterizing biomechanics of the shots being taken, for instance, from the sides and behind the player. The biomechanics are characterized for the ideal form of the subject's body for shooting the basketball, which may be analyzed for training purposes. In some embodiments, the video cameras may have a relatively high frame rate to capture relatively fast movements of the player, for instance, greater than about 50 or greater than about 100 frames per second. Some embodiments may further include depth sensing cameras, for example, those configured to transmit structured light patterns onto a scene and capture frames of video depicting a position of the structured light to infer depth, lidar sensors, ultrasonic sensors, time-of-flight sensors, and the like. Some embodiments may further include a floormat with a matrix of pressure sensors to capture pressure readings and locations from the player's feet as they move and go up for a shot as an additional channels of information to characterize biomechanics and detect shots. Other sensors include audio sensors to detect sliding shoes and contact sensors to detect when contact is made with the ball or player. The controller is configured to trigger the actuating system to rotate and extend the first arm and the second position the hand portion in the extended position to automatically block a sports player in response to a sensor input, wherein the sensor input is a motion by the sports player.

Output from the sensors may be used by a controller (e.g., and obtained via a CAN bus or local area network) described below to engage various actuators of the robotic shot defender. Examples include a lateral movement actuator, such as a side to side or back to back actuator, like a set of wheels with a servo or stepper motor drive. Some embodiments may be configured to implement more degrees of freedom in lateral movement of the robot within the frame of reference of a court. For example, some embodiments may implement two or three degrees of freedom of movement of the robotic shot defender with mecanum and wheels or omni wheels controlled by a set of corresponding drives, like pneumatic drives, stepper motors, servomotors, or the like. In some embodiments, the actuator and wheels may be mounted to a chassis adjacent the floor that supports the other components of the robotic defender above the chassis.

In some embodiments, other components may include a robot core, extending upwards from the chassis, analogous to the core of the human body to which movable arms are mounted and stereoscopic cameras and other sensors are mounted. In some embodiments, the robot core may have one or more degrees of freedom relative to the chassis, for instance one, two, or three of freedom, such as corresponding to leaning forward, leaning sideways, and twisting about the vertical axis, and some embodiments may be further configured to translate vertically up and down relative to the chassis to mimic a player jumping to block a shot.

In some embodiments, actuators for one or two arms may be mounted to the core, in some cases with the arms having one, two, or three degrees of freedom relative to the core. In some embodiments, the core and arm actuators may be driven by pneumatic motors, stepper motors, servomotors, or the like. In some embodiments, movement may be actuated by a resilient member, like a spring or an elastomeric band that is released after having been placed in a stretched configuration by a slower-acting electrical or pneumatic actuator to obtain relatively fast, powerful movements with motors that are less expensive than those that would support such movements directly. For instance, the resilient members may be stressed over a first duration of time between shots, and then released over a second, much shorter duration of time, to block a shot with a fast movement.

In some embodiments, the sensor suite and the actuators may couple to a controller, which in some cases may be entirely onboard the rope robotic defender, may be in the same room as the robotic defender, or may be remote, for instance at a remote server, or in some embodiments, various components may be distributed among these various locations for computing equipment. In some embodiments, relatively latency sensitive computation may be located closer to the robotic defender, for instance, on board the robotic defender for things like shot detection to trigger a movement of the actuators to block a shot, while other types of computation may be more compute intensive and may be distributed remotely, for instance, analysis of various biomechanics over a collection of samples of time-stamp synchronized channels of sensor data corresponding to different shots. In some embodiments, the controller includes a Linux-based or Windows-based computer executing various processes described below to control the actuators responsive to these channels of information from the sensor suite.

In some embodiments, the controller includes a human pose estimator which may ingest various (e.g., all) channels of sensor information including video data and infer a pose of the player practicing shots in real time, for instance with less than hundred milliseconds, less than 50 ms, or less than 5 ms of latency). In some embodiments, the human pose estimator may implement a skeleton-based model, contour-based model, or a volume-based model of the player. In some embodiments, the model may further include a relative position of the player to the robotic shot defender. In some embodiments, inferred pose of the player may be updated relatively frequently, for instance consistence with the latency examples discussed above, and in some cases, updates may be based on a previous pose, e.g., as an input feature to the model. In some embodiments, the human pose estimator may ingest multiple channels of information from the sensor suite in addition to an array of cameras, for example including channels indicative of depth, pressure on a floormat with the pressure sensor matrix, ultrasonic readings indicative of distance, lidar readings, and the like.

In some embodiments, the human pose estimator may implement a deep convolutional neural network (for instance having 5 or more, 15 or more, or 40 or more layers of perceptrons). In some embodiments, the human pose estimator may implement temporal depth-separable convolutions, for instance, like those implemented in MobileNet version 3 (as described by Howard et al, in "Searching for MobileNetV3," arXiv:1905.02244, the contents of which are hereby incorporated by reference), to expedite operations with fewer computing resources used in non-depth separable convolutions, potentially at the expense of a relatively small loss of accuracy. In some embodiments, the human pose estimator may implement the techniques described by Pavillo et al, in "3D human pose estimation in video with temporal convolutions and semi-supervised training," arXiv:1811.11742, the contents of which are hereby incorporated by reference. In some embodiments, the human pose estimator may run on a computer vision hardware accelerator, like an edge tensor processing unit, or the like to obtain more performance.

Some embodiments may further include a ball tracker model, for instance, implemented with the same class of neural networks, drawing from the same sensor suite, to track position of a ball relative to the robotic defender or in a coordinate system of the court. Embodiments may include a deep convolutional neural network operative to perform object detection and localization of the ball in frames of video from multiple cameras and translate such detections from various cameras at different poses into a position of the ball in the room.

In operation, the controller may detect shots and engage the actuators, for instance, moving up the core and the arms and laterally positioning the robotic defender, to attempt to block the shot. In some embodiments, these movements may be tuned based upon profiles of professional basketball players downloaded from the remote server, for instance, with some professional basketball players having a higher reach but a slower response time or vice versa or some professional black basketball players favoring their left arm with her right arm to block shots. Other examples include distance between the player and the shot blocker robot that may depend upon player profile. In some embodiments, the human pose estimator and ball tracker may feed into a shot classifier, for instance, an ensemble model, that infers whether the player is taking a shot based upon things like current and past estimations in human pose (like gaze orientation, head position, knees position, and movement of the player center of body and arms) and movement of the ball (like being held in both hands momentarily and moving upward well in contact with a human's hand). Upon detecting a shot, some embodiments may actuate a shot block maneuver. In some embodiments, the professional basketball player profiles may further include tuning parameters based upon how quickly professional basketball players are to detect that a shot is being taken, with some responding more slowly than others. In some embodiments, these profiles may be learned by training a human pose estimator and ball tracker on video of professional basketball games.

Other operations of the controller may include positioning the robotic shot defender on the court to block a shot. Some embodiments may compute a difference in position and orientation of the robotic shot blocker and the player (in some cases modeling a future position of the player and computing a delta as well to be controlled) and adjust the that difference to position the robotic shot blocker to mimic the behavior of a professional basketball player or otherwise attempt to block the shot. In some embodiments, contact sensors on the robotic shot blocker may detect when a player makes contact and disengage all movements with the lateral movement actuators. Some embodiments may implement a controller, like a proportional integral differential controller, to attempt to maintain an optimal relative distance of the robotic shot blocker in the player to determine how to actuate the lateral movement actuators. In some embodiments, core actuators may also be engaged as part of lateral movements, for instance leaning into a movement in a manner similar to how a human does. For example, some embodiments may model and control the core (which is core in the sense of a human body core, not in the sense of being required in all instances) as an inverted pendulum, and position the core to reduce torque as the chassis accelerates.

Some embodiments may classify various movements of the player. Examples include detecting and classifying believability of head fakes of the player. Some embodiments may score a trailing set of movements of the player based upon likelihood of the player being about to engage in a shot, and some embodiments may detect missed classifications of shots or near miss classifications as head fakes (e.g., upon a shot-classification score exceeding a threshold) and provide a score based upon the believability of the head fakes for the score player to store in their profile and displayed to the player.

Some embodiments may classify various metrics of biomechanics of shots of the player, like time to get a shot off from the time at which the player shot movement began, elbow position at various stages of shot, head position, balance, jumping height, knee position through various movements of the shot, and correlations therebetween. Some embodiments may compute a deviation from ideal form and score biomechanics based upon an aggregate measure of deviation or detect particular problematic areas. Examples include an aggregate measure of deviation across a plurality of joints, or metrics of max deviation among such a set. Some embodiments may store these results and corresponding video in the player profile, and in some cases, the player may access these profiles, for instance during rafter practice section to see a video overlay of the actual shot, for instance from a camera from the side of a court overlaid with a transparent model showing what an optimal biomechanics movement would look like in that shot.

In some embodiments, the controller may further implement various user interfaces related to gestures. For example, in some embodiments may renew a blocking mode or change profiles responsive to the player slapping a ball to change modes, for instance, from a non-shock blocking mode to a shot blocking mode or the player raising their hand and waving at left to right to indicate that the shot blocker should respond faster be more aggressive or less aggressive.

In some embodiments, the controller may analyze shots of the player and provide feedback. In some embodiments, the feedback may be provided to the player after each shot to improve the player's skill at making shots by identifying the strengths and weaknesses of the player, including the elbow position at various stages of shot, head position, balance, jumping height, knee position through various movements of the shot, and correlations therebetween. In some embodiments, the feedback may be provided after a series of shots (e.g. after about 15 minutes of training or after a full training session) to analyze the performance of the player (speed, form, accuracy, etc.) The analysis may include qualitative (e.g. too high or too low) and quantitative (e.g. height of the jump, angle of the elbow, etc.) feedback.

In some embodiments, the controller may provide some statistics after a training session to the player. Such statistics may include the number of shots, the location of each shot, number of makes, misses, clean shots, close misses, progress during the training session, average jumping height, speed, angle, number of running shots, lay-up shots, jump shots, bank shots, hook shots, set-shots, free throws, etc.

In some embodiments, the feedback may be comminuted to the player during a training session via various means, including an interface (e.g. a monitor) showing the feedback, an audio system, and data reported to the coach. In some cases, players may pay a subscription to obtain feedback and coaching via a native application on their mobile device or on the defender. Examples of feedback are described herein and include how high the player is jumping, whether they are jumping right or left, forward or backward, whether the player is leaning when shooting and a direction, etc., in some cases shown with a delta relative to an ideal form. Feedback may also include shot positions, where shots were missed and made, total shotes, heatmaps of shot percentages on the court, etc. In some cases, user interfaces may include speakers and video of the shots may be captured with an application on the user's mobile device by which a subscription is managed. In some cases, the UI includes lasers that indicate where on the floor the user's feet should be positioned for a shot. The laser or projectors project a laser line or optical markings on the floor that are used to help align the shooter and for safety. This laser line or optical markings shows the shooter to try not to cross so they do not contact the arm portion, and for computer vision processing. The laser or projector may be mounted in the base or may be on the body portion.

The present techniques have been described with reference to basketball, but the robotic shot blocker is expected to have application in a variety of other forms of fitness and sports, examples including volleyball, soccer, football, badminton, tennis, pickle ball, and the like.

In some embodiments, various types of robots may be used to attain relatively fast movement of a member configured to block shots, like a hand-shaped end effector. In some cases, such an end effector may be mounted to five-bar robot or scissor, having two motors controlling two degrees of freedom (e.g., in a plane that bisects a line from the player to the basket). Angular position of the motors may specify a location of the end effector. As described above, a camera may be used to track the ball and position the end effector to block a shot. In some cases, the end effector and arms may be made of a relatively lightweight material, like carbon fiber composites to facilitate fast movement. In some cases, only a right arm or a left arm (having a mechanical movement like that of a human arm) may be mounted to the defender to favor passing on the other side. Or embodiments may have arms on both sides.

In some cases, the robot may have an inverted horseshoe shape, with the legs of the u pointing down and the u in a plane between the player and the basket. In some cases, the u may be curved, like a u written on a curved piece of paper, so that the legs and top define a concave shape when viewed from the side. In some cases, the defender apparatus may be about waist high (e.g., less than about 5 or about 4 feet high) to facilitate passing.

Figure 5:
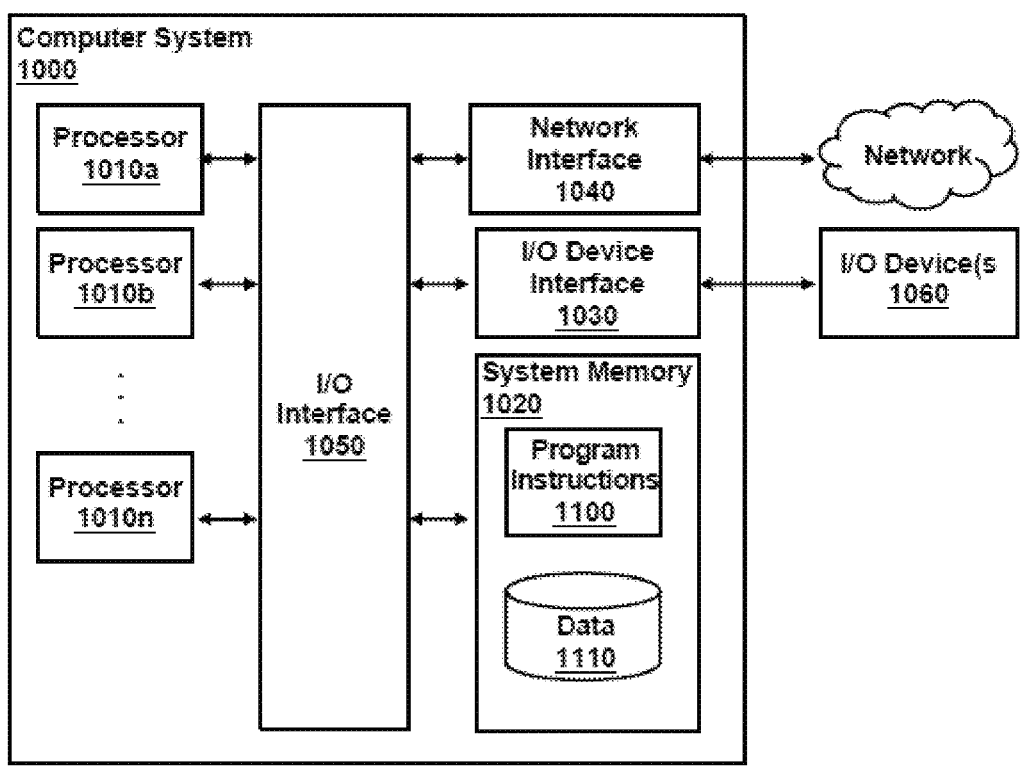
FIG. 5 illustrates an example of a computing device by which the present techniques may be implemented.

FIG. 5 is a diagram that illustrates an exemplary computing system 1000 by which embodiments of the present technique may be implemented. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the figures are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third,"

"given" and so on, if used in the claims, are used to distinguish or otherwise identify, and not to show a sequential or numerical limitation.

What is claimed is:

1. A robotic defender system comprising:
a body portion operably coupled to an actuating system and a controller and a movable base, wherein the actuating system moves from a non-extended position to an extended position;
the moveable base including a wheel system operably coupled to a battery to move the robotic defender;
the actuating system includes a first arm and a second arm, wherein the first arm includes the hand portion extending from the first arm and the second arm is operably connected to an arm bar;
the first arm is rotatable with respect to the second arm about axis R1 and the second arm is rotatable with respect to the arm bar about axis R2, and the rotation of the first arm about axis R1 extends the hand portion generally in direction D1 to the extended position, and rotation of the second arm about axis R2 extends the first arm generally in direction D2 to the extended position;
a controller operably coupled to the actuating system, body portion, and the moveable base, wherein the controller is configured to trigger the actuating system to rotate and extend the first arm and the second position the hand portion in the extended position to automatically block a sports player in response to a sensor input, wherein the sensor input is a motion by the sports player;
wherein the first arm and is operably coupled to the second arm by way of the first motor, and the second arm is connected to the arm bar by way of second motor; and the arm bar is connected to the top portion of by the body portion;
wherein the first motor is rotatably coupled to a first pin, and the second motor is rotatably coupled to a second pin; the arm bar is connected to the top portion of the body portion by way of a rotatable coupling and a cap, wherein the rotatable coupling allows the arm bar to rotate about an axis R3 with respect to the body portion, and move the actuating system in direction D3;
wherein a middle portion of the body portion includes a central coupling, which connects to the controller by way of a pin, and the central coupling allows the controller to rotate about an axis with respect to the body and allows the middle portion to move the body portion upwards or downwards.

2. The robotic defender system of claim 1, wherein a bottom portion of the body portion connects to the moveable base by way of the circular seat, wherein the circular seat allows the body portion to rotate about an axis with respect to the moveable base.

3. The robotic defender system of claim 2, wherein the controller is operably coupled to a sensor suite selected from the group consisting of: a camera, a depth camera, ultrasonic sensors, infrared transmitters and receiver, contact sensors, audio sensors, and the like.

4. The robotic defender system of claim 3, wherein the controller is configured to calculate a determined distance between Objects of Interest and the robotic defender, and based on the determined distance, the controller selects a defending strategy in response to the sensor input, and the defending strategy is selected from the group consisting of: blocking, jumping, extending arms, moving left to right, and moving forwards or backwards.

5. The robotic defender system of claim 4, wherein the robotic defender is configured to autonomously position itself relative to an Object of Interest in response to the sensor input, wherein the autonomously positioning moves vertically to block the Objects of Interest, the autonomously positioning moves on the floor with one degree of freedom, the autonomously positioning moves on the floor with two degrees of freedom, the autonomously positioning moves with 3 degrees of freedom.

6. The robotic defender system of claim 5, wherein the controller is configured to process data from the sensor suite and determine the number and the location of Object(s) of Interest relative to the robotic defender; and the controller processes the received data to capture the trajectory of fast moving Object(s) of Interest.

7. The robotic defender system of claim 6, wherein the controller perform data association tasks by machine learning techniques to predict object positions and movements, track the progress of the sports player, and provide feedback to the player to improve sports performance.

8. The robotic defender system of claim 7, wherein the machine learning techniques predict the behavior of a shooter including timing, jumping height, speed, extension of arms, form, body posture, to increase the chance of the robotic defender successfully blocking the shot.

9. The robotic defender system of claim 8, wherein the machine learning techniques include a model tuned for simulating the defending skills of a specific player.

10. The robotic defender system of claim 9, wherein the controller is configured to rank detected Objects of Interest based on their class including the player with the ball, player closer to the robot, player in better position to take a shot, the controller rank the Objects of Interest based on their distance from the robotic defender; and based on these rankings the controller identifies a singular object of interest to be the highest priority.

11. The robotic defender system of claim 10, wherein the controller is operably coupled to a plurality of sensors that monitor the surrounding area and specifically target a user as the Object of Interest; and the plurality of sensors are configured to determine the moment that the player will shoot by focusing on the movements of the player in possession of the ball and tracking the player's eyes, knees, arms, or other body parts to monitor when the player will shoot.

12. The robotic defender system of claim 11, wherein the controller is operably coupled with a remote server storing profiles of defensive players, including profiles with configuration parameters that tune robot behavior to match that of various professional basketball players identified in association with the profiles, such that users can select a given professional basketball player as a defender to be loaded into a model controlling operation of the robotic defender over the Internet from the remote server; and the remote server receive, via the Internet, metrics indicating performance of a player practicing with the robotic defender, for example, shot locations, shot percentages, block percentages, and various biomechanical metrics or recordings of the player taking shots.

13. The robotic defender system of claim 12, further comprising a sensor suite located local to a facility where the robotic defender is being used, including sensors located on the robotic defender or deployed in the same room and communicating via a local area network connected to an access point configured to communicate with the remote server; wherein the sensors are oriented in the opposite direction to capture video of the backboard of a basket to track whether shots are made, and the sensors capture video suitable for characterizing biomechanics of the shots being taken.

14. The robotic defender system of claim 13, wherein the output from the sensor suite is used by the controller engages the actuating system to induce a lateral movement actuator, implement more degrees of freedom in lateral movement of the robotic defender within the frame of reference of a court.

15. The robotic defender system of claim 14, further comprising a robot core, extending upwards from the body portion, analogous to the core of the human body to which movable arms are mounted and stereoscopic cameras and other sensors are mounted to receive the sensor input.

16. The robotic defender system of claim 15, wherein the controller is operable to a computing system including one or more processors coupled to system memory, an input/output I/O device interface, and a network interface via an input/output (I/O) interface.

\* \* \* \* \*